United States Patent
Gomez et al.

(10) Patent No.: US 7,587,676 B2
(45) Date of Patent: Sep. 8, 2009

(54) SYSTEM AND METHOD FOR INHIBITING INTERACTION WITH MALICIOUS SOFTWARE

(75) Inventors: Laurent L. Y. Gomez, Le Cannet (FR); Cedric R. J. Hebert, Sartoux (FR); Cedric S. P. Ulmer, Nice (FR)

(73) Assignee: SAP AG, Walldorf (DE)

( * ) Notice: Subject to any disclaimer, the term of this patent is extended or adjusted under 35 U.S.C. 154(b) by 716 days.

(21) Appl. No.: 10/931,648

(22) Filed: Aug. 31, 2004

(65) Prior Publication Data

US 2006/0048225 A1 Mar. 2, 2006

(51) Int. Cl.
*G06F 3/00* (2006.01)
(52) U.S. Cl. .................................. 715/741; 726/22
(58) Field of Classification Search ............... 726/722, 726/3, 10, 22–25; 715/705, 741–749; 713/150, 713/185–188, 193–194; 717/100; 709/224, 709/225, 59
See application file for complete search history.

(56) References Cited

U.S. PATENT DOCUMENTS

| 6,799,277 | B2 * | 9/2004 | Colvin | 726/22 |
| 6,931,548 | B2 * | 8/2005 | O'Connor | 726/22 |
| 6,931,552 | B2 * | 8/2005 | Pritchard et al. | 726/34 |
| 7,058,822 | B2 * | 6/2006 | Edery et al. | 726/22 |
| 7,234,164 | B2 * | 6/2007 | Carmona | 726/22 |
| 2003/0009687 | A1 * | 1/2003 | Ferchau et al. | 713/200 |
| 2004/0148524 | A1 * | 7/2004 | Airamo | 713/201 |
| 2004/0205772 | A1 * | 10/2004 | Uszok et al. | 719/317 |
| 2005/0071668 | A1 * | 3/2005 | Yoon et al. | 713/200 |
| 2005/0235355 | A1 * | 10/2005 | Dybsetter et al. | 726/22 |
| 2006/0015940 | A1 * | 1/2006 | Zamir et al. | 726/22 |
| 2006/0026675 | A1 * | 2/2006 | Cai et al. | 726/22 |

* cited by examiner

*Primary Examiner*—William L Bashore
*Assistant Examiner*—Meseker Takele

(57) ABSTRACT

A technique for protecting against installation of malicious software includes preventing interaction with a software product when keywords in a disclaimer associated with the software product are detected. A computing device identifies keywords in a disclaimer associated with a software product. If keywords are identified, further interaction with the software is prevented by removing interactive content that facilitates interaction with the software and adding interactive content facilitating sending a request to an administrator for permission to interact with the software. The administrator determines whether interaction with the software product is permitted.

22 Claims, 16 Drawing Sheets

SYSTEM AND METHOD FOR INHIBITING INTERACTION WITH MALICIOUS SOFTWARE

BACKGROUND OF THE INVENTION

Graphical widgets often prompt a user to install software. For example, when a user surfs the web, a pop-up window with a format that is similar to the pop-up window format 10 depicted in FIG. 1 may prompt the user to initiate software download and installation. If the user clicks the OK button 12, software may be downloaded and installed. Download prompts could also be incorporated into an advertisement with a format that is similar to the advertisement format 20 depicted in FIG. 2. If the user clicks the OK button 22, software may be downloaded and installed.

Some pop-up windows are based on the ActiveXControl technology and installation setup is associated with a certificate. A certificate verification window with a format that is similar to the certification window format 30 depicted in FIG. 3 may be used to prompt a user to download software. If the user clicks on the cancel button 32, the software is not downloaded. If the user instead clicks on the OK (Trust) button 34, the software is downloaded. In addition, if the user clicks on the Always Trust checkbox 36, the certificate is automatically trusted next time. Certificates can prevent some malicious software from being downloaded, but only if the user doesn't ignore the verification. However, all too often, the user clicks "Okay" even if the verification fails.

A similar security risk may arise when an employee fails to read a disclaimer or license when installing software. A disclaimer with a format that is similar to the disclaimer window format 40 depicted in FIG. 4 may be used to prompt a user to agree to a disclaimer or license. The disclaimer window includes disclaimer text 42, which the user is supposed to read. If the user clicks on the Do Not Agree button 44, the software is not installed. If the user clicks on the Agree button 46, the software is installed. Malicious software, such as spyware, may be an add-on to a software bundle. The malicious software may even be mentioned in the disclaimer text 42. Users who fail to read the disclaimer carefully may unwittingly install the malicious software.

DETAILED DESCRIPTION OF THE INVENTION

Figure 5:
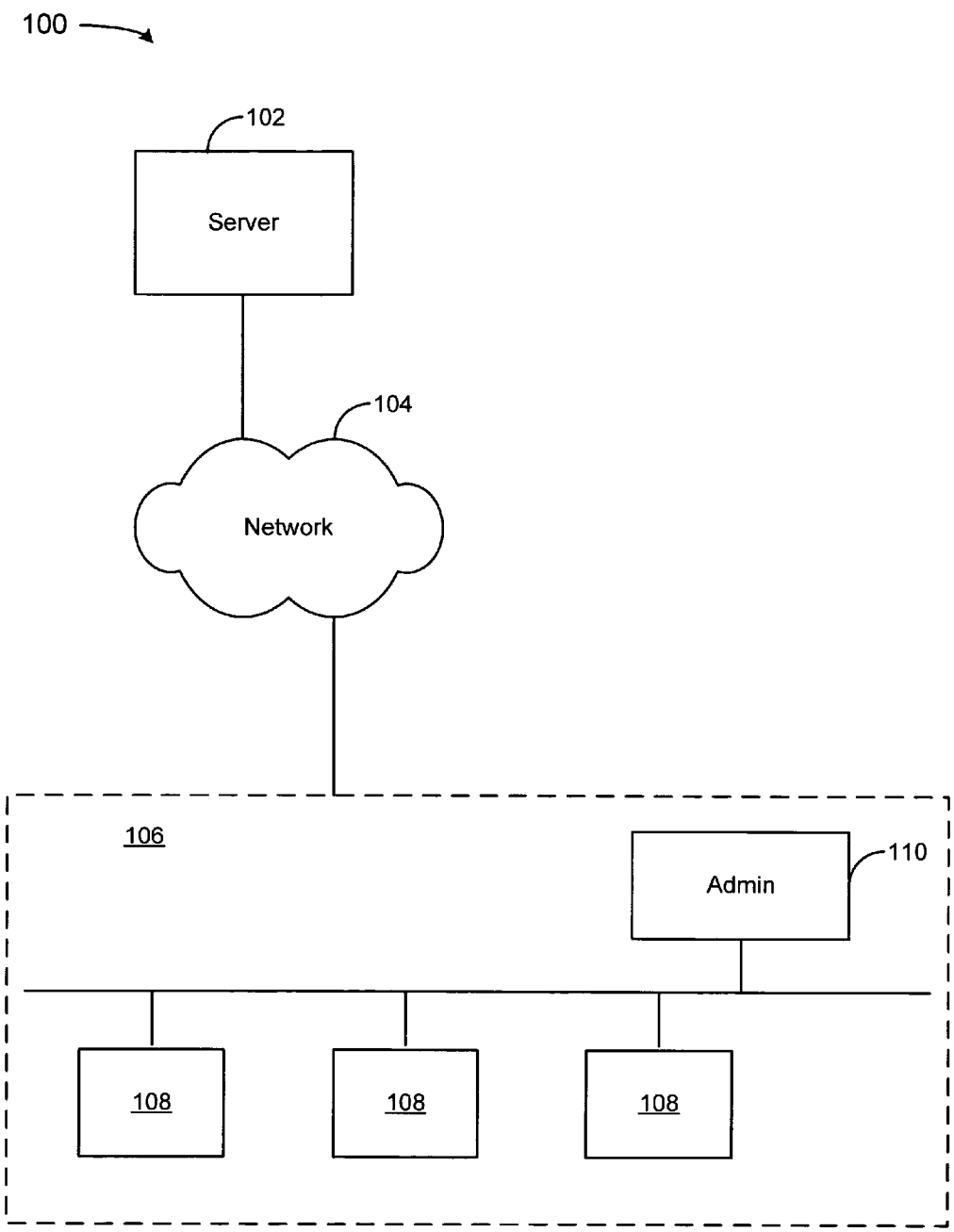
FIG. 5 depicts a system for reducing risks associated with malicious software installation.

FIGS. 1-4 were described in the Background of the Invention section. FIG. 5 depicts a system 100 for reducing risks associated with malicious software installation, as described later with reference to FIGS. 6-16. System 100 includes a server 102, a global network 104, and an enterprise network 106. The enterprise network 106 includes a plurality of computing devices 108 and an administrative computing device 110. In the example of FIG. 5, one of the computing devices 108 receives a prompt—such as a pop-up window, an advertisement, a certificate validation window, a disclaimer/license window, or some other prompt—from the server 102. The prompt may be related to a software download available from the server 102 over the global network 104. An administrator, using the administrative computing device 110, determines whether the computing devices 108 are allowed to download the software from the server 102.

In an alternative, the server 102 may provide a prompt and another server (not shown) may provide the software for download. In another alternative, the software may be available from an internal source, such as a floppy disk. The global network 104 may be the Internet. The enterprise network 106 may be an intranet. The computing devices 108 may be general purpose computers, workstations, docking stations, mainframe computers, wireless devices, personal data assistants (PDAs), smartphones, or any other computing device that is adaptable to download software. The administrative computing device 110 may be any computing device, as well. Moreover, the administrative computing device 110 could simply be one of the computing devices 108 that is used by an administrator. For example, the administrator may receive email related to administrative decisions and respond to the email using any available communication means. In an alternative, the administrative computing device 110 has decision-making functionality; an administrator makes none or only some of the administrative decisions regarding software download or installation. In another alternative one or more of the computing devices 108, or the administrative computing device 110, may be located remotely. In this alternative, the remote devices may be in communication through the network 104.

Figure 6:
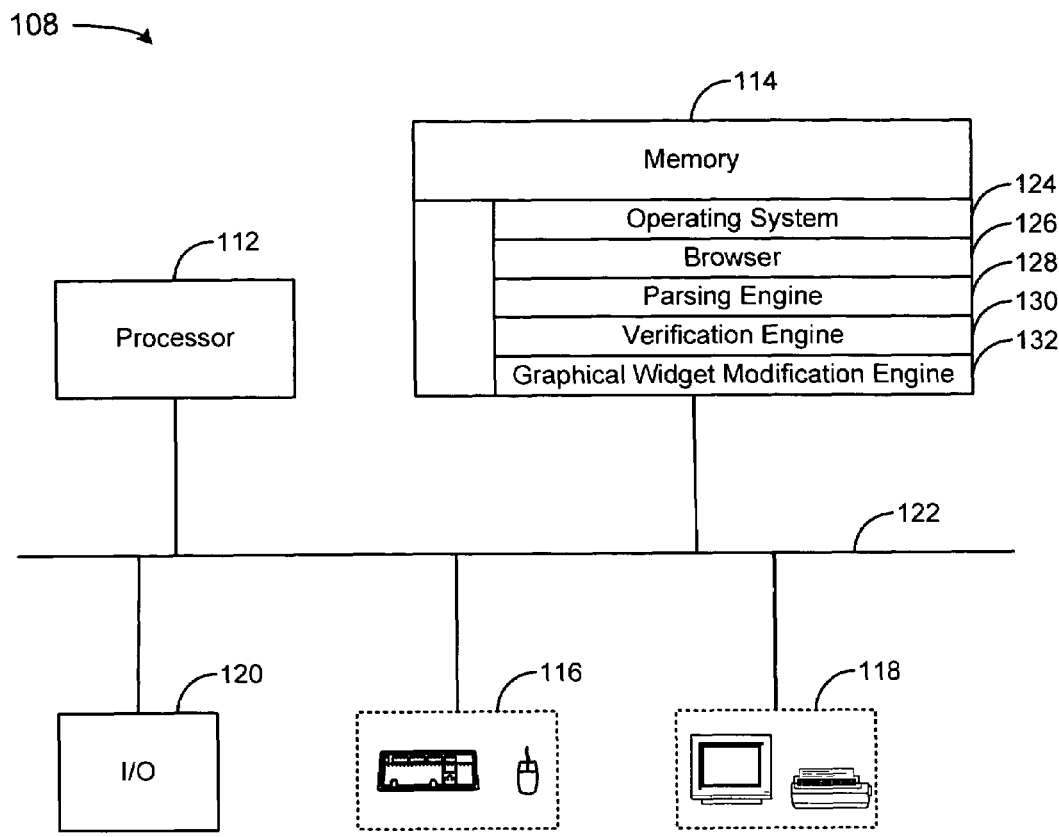
FIG. 6 depicts an exemplary computing device for use in the system of FIG. 5.

FIG. 6 depicts an exemplary computing device 108 for use in the system 100 (FIG. 5). The computing device 108 includes a processor 112, memory 114, input devices 116, output devices 118, and an I/O device 120. A bus 122 couples the components together. The processor 112 may be a microprocessor, central processing unit (CPU), or any other computing mechanism for executing instructions stored in the memory 114, or for performing other computer-related processing tasks. The memory 114 may include random access memory (RAM), static RAM (SRAM), dynamic RAM (DRAM), optical storage, electronic storage, magnetic storage, or any other computer readable memory for storing executable instructions, including programs, batch files, modules, routines, procedures, computer-implemented methods, or code. Input devices 116 may include mice, keyboards, touchpads, joysticks, navigation devices, bar code readers, external or internal storage devices, modems, wireless inputs, or any other devices that provide input to the computing device 108. Output devices may include monitors, external or internal storage devices, modems, wireless outputs, or any other devices that receive output from the computing device 108. Some input devices may include status lights or other components that receive output and some devices may serve as both input and output devices. The I/O device 120 may be one of the input devices 116, on of the output devices 118, a modem, a port, or some other mechanism or channel that facilitates communication over the enterprise network 106 (FIG. 1) or over an external network, such as the Internet.

The memory 114 may include an operating system 124, a browser 126, a parsing engine 128, a verification engine 130, and a graphical widget modification engine 132. The operating system 124 may be any operating system, including Windows™, Unix, Macintosh, Java™, Linux, or some other operating system. The browser 126 may be any program used to access information from a local or remote memory. The browser 126 may be Internet Explorer™, Netscape Navigator™, AllFusion Saphir Browser, Business Explorer (Bex) Browser, or some other graphical, HTML-based, or text-based program. The parsing engine 128 may be any program used to check a document for words, phrases, sequences, images, icons, identifiers, or other data (collectively referred to hereinafter as keywords). The verification engine 130 is for verifying certificates, such as certificates that use ActiveX or other technology. The graphical widget modification engine 132 is for modifying graphical widgets in a manner that is dependent upon the results of the parsing engine 128 and/or verification engine 130, as described with reference to FIG. 7.

Figure 7:
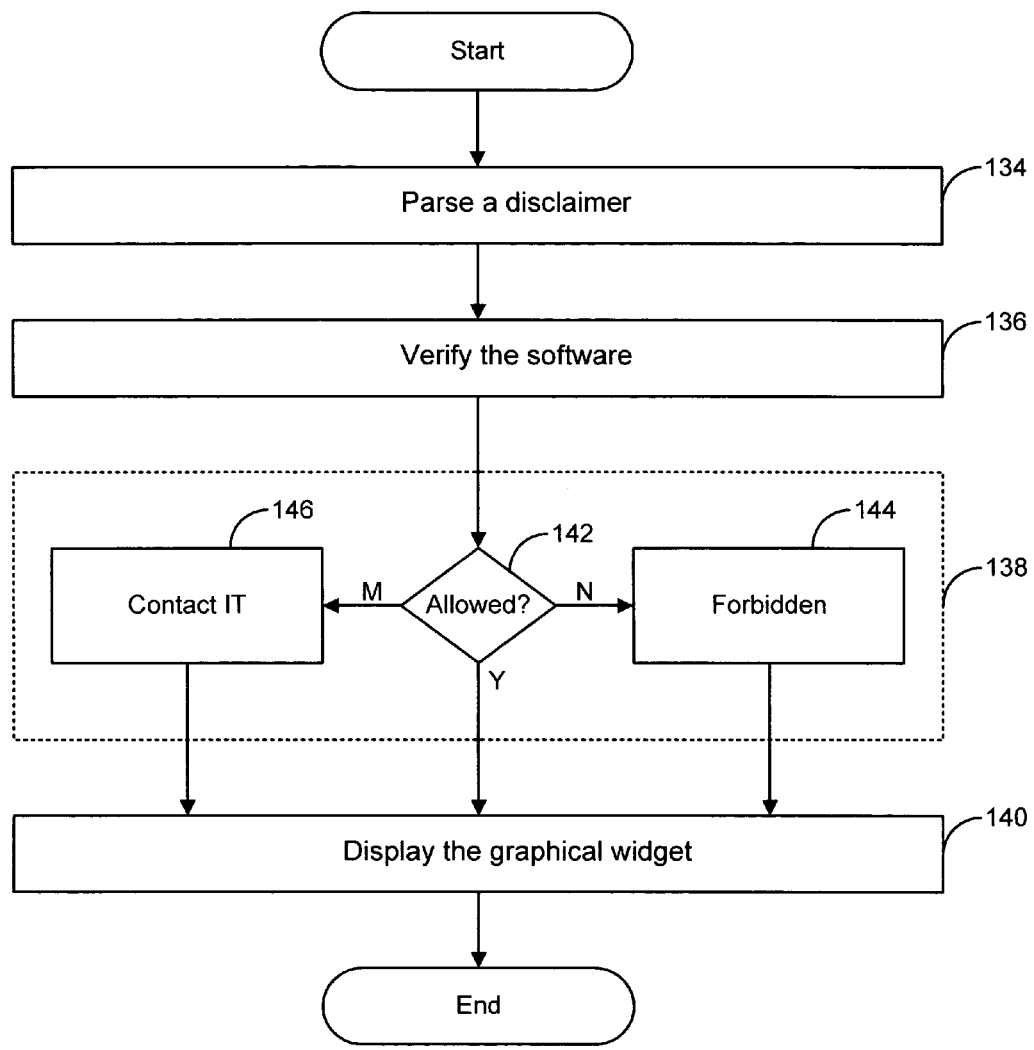
FIG. 7 depicts a flowchart of an exemplary method for use with the computing device of FIG. 6.

FIG. 7 depicts a flowchart of an exemplary method for use with the computing device 108 (FIG. 6). For exemplary purposes, reference is made to the computing device 108 when describing the flowchart. The flowchart begins at block 134 with parsing a disclaimer. The disclaimer is associated with software that is to be downloaded, installed, or otherwise interacted with. The disclaimer may appear in a pop-up window, such as that described with reference to FIG. 4. The disclaimer may be displayed by the operating system 124, the browser 126, or some other means. The disclaimer may be parsed by, for example, the parsing engine 128. Parsing the disclaimer involves searching the text (or graphical portions) of the disclaimer for keywords that are potentially undesirable. Keywords found in a disclaimer are highlighted, flagged, or otherwise noted. It should be noted that if a disclaimer is not displayed when downloading, installing, or otherwise interacting with software, block 134 may or may not be skipped.

The flowchart continues at block 136 with verifying the software. Verification may involve checking a certificate, checking a URL associated with a server from which the software is to be downloaded or which is associated with the disclaimer or certificate, or checking some other identifier associated with the software. The verification engine 130 may perform the verification. Verification is described later with reference to FIG. 15. It should be noted that if a certificate, a disclaimer, or some other identifier associated with the software is not available, block 136 may or may not be skipped.

The flowchart continues at block 138 with modifying a graphical widget, if applicable, and the flowchart ends at block 140 with displaying the graphical widget. Referring back to block 138, at decision point 142 (within block 138), it is determined whether the software disclaimer, certificate, or other identifiers associated with the software indicate that download, installation, or interaction with the software is allowed. The graphical widget modification engine 132 may modify the graphical widget depending upon results of the parsing at block 134 or the verification at block 136. If the software is allowed (142-Yes), then at block 140 the graphical widget may be displayed without modification in a format such as those described with reference to FIGS. 1-4, or some other format. If the software is not allowed (142-No), then at block 144 the graphical widget may be modified to prevent interaction with the software, as described later with reference to FIG. 10 and depicted in FIG. 11, for example. If it has not yet been determined whether the software is allowed (142-Maybe), then at block 146 the graphical widget may be modified to prevent interaction with the software, except to request permission from an administrator, as described later with reference to FIG. 10 and depicted in FIGS. 12-14, for example.

It should be noted that, though the flowchart ends at block 140, if the graphical widget was displayed normally at block 140, a user may be required to click an OK button or perform some other action to continue interaction with the software, as normal. Also, if an administrator is to be contacted, as described with reference to block 146, a user may need to click on a Contact IT button or perform some other action in order to contact the administrator. These actions are described later with reference to FIG. 10.

Figure 8:
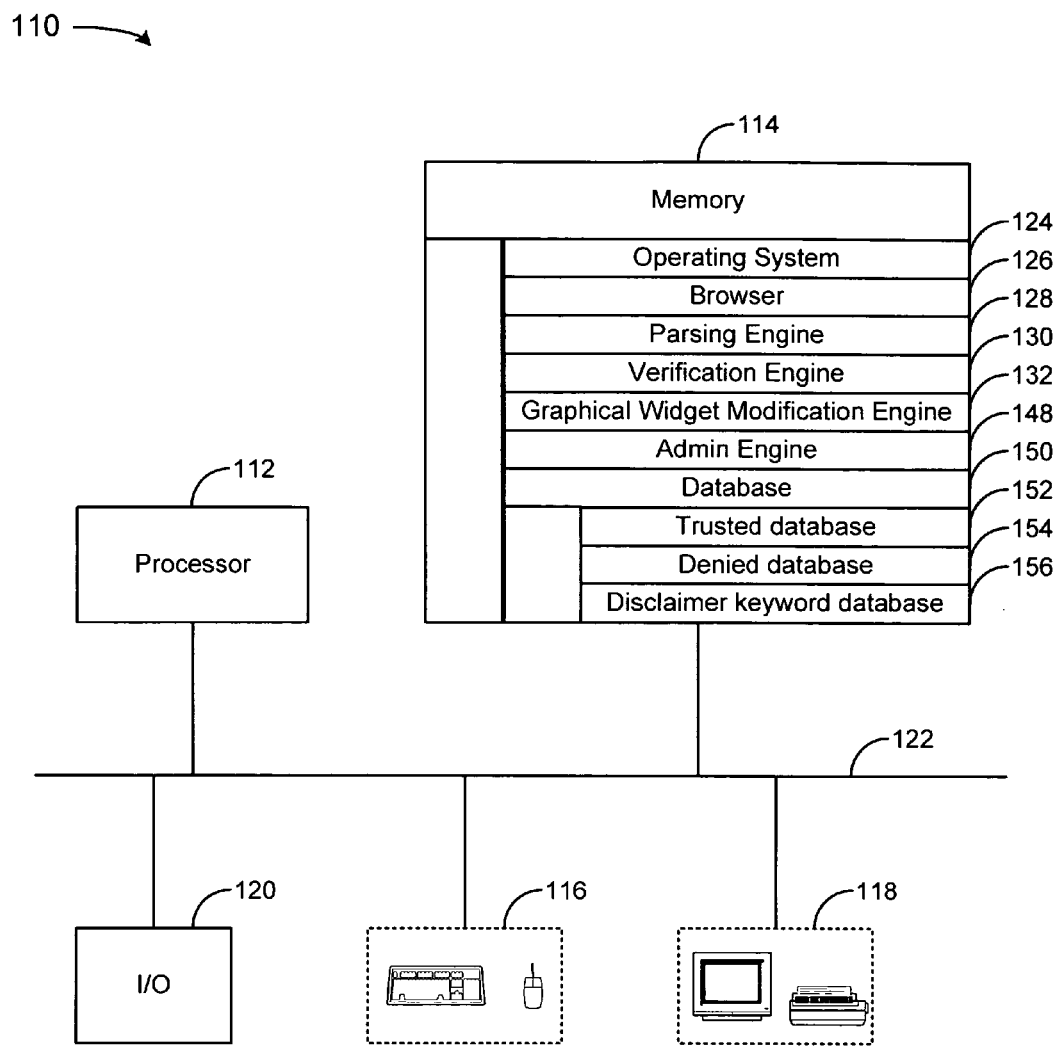
FIG. 8 depicts an exemplary administrative computing device for use in the system of FIG. 5.

FIG. 8 depicts an exemplary administrative computing device 110 for use in the system 100 (FIG. 5). The administrative computing device 110 may include many of the components of a computing device 108, as described with reference to FIG. 6. In fact, in an alternative, the administrative computing device is one of the computing devices 108 that is used by an administrator. However, the memory 114 of the administrative computing device 110 may include an admin engine 148 and database 150. The database 150 may include a trusted database 152, a denied database 154, and a disclaimer keyword database 156.

Figure 1:
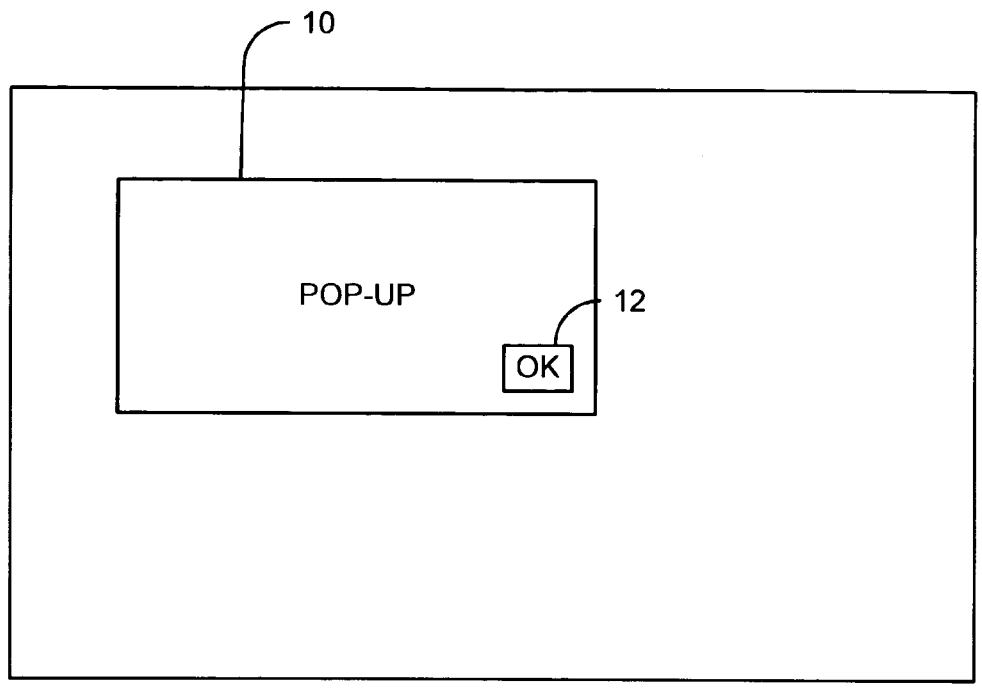
FIG. 1 depicts a prior art pop-up window format.
Figure 2:
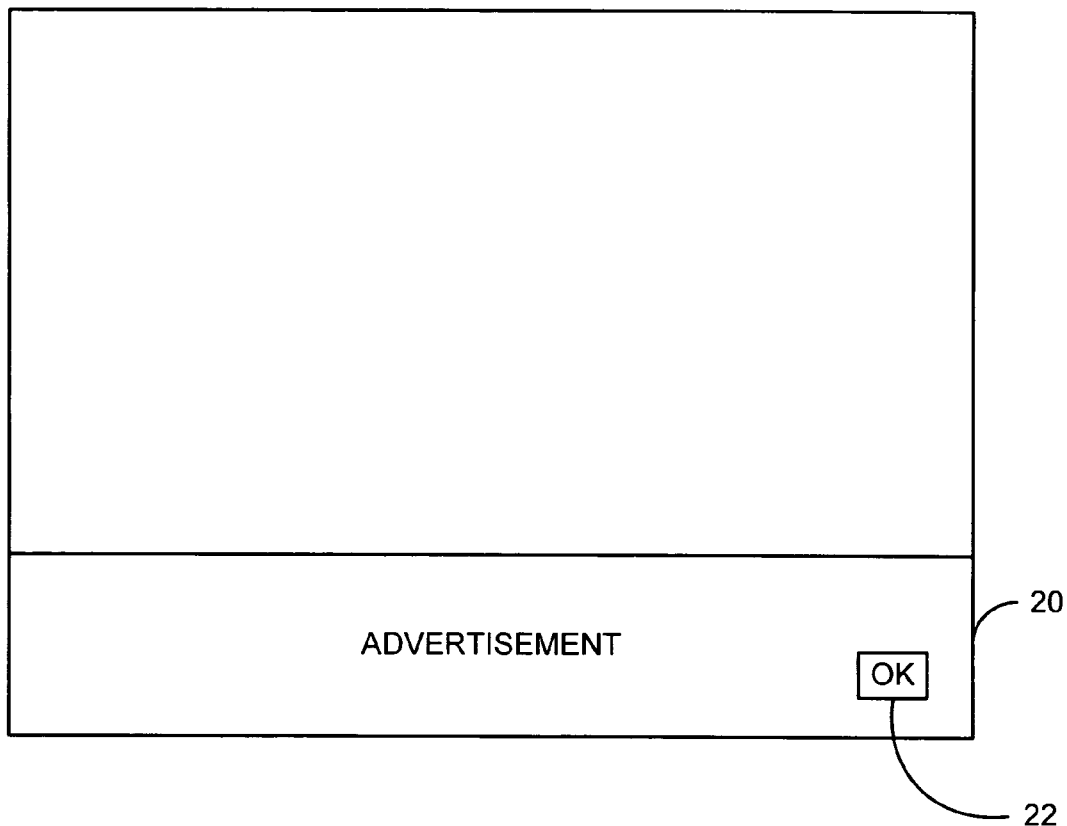
FIG. 2 depicts a prior art advertisement window format.
Figure 3:
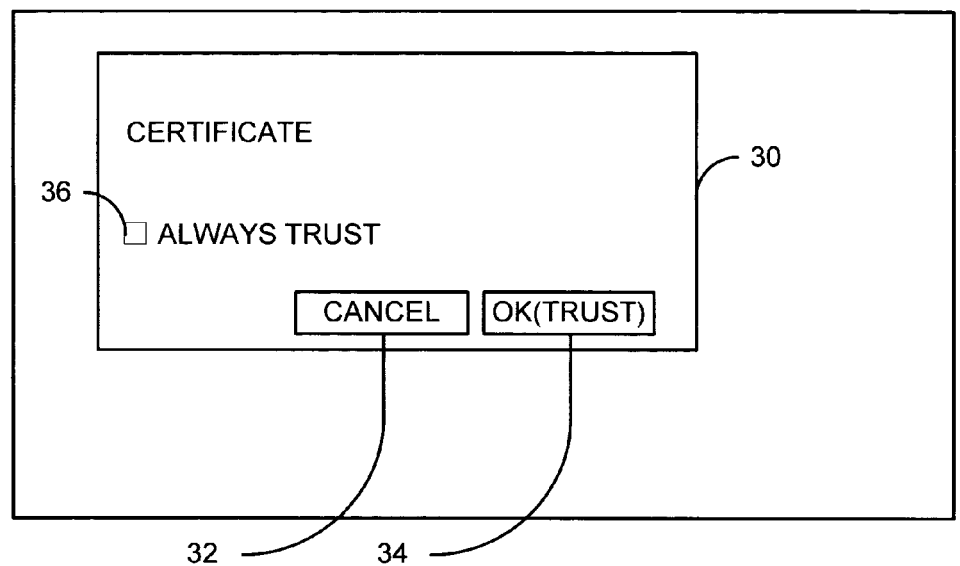
FIG. 3 depicts a prior art certificate verification window format.
Figure 4:
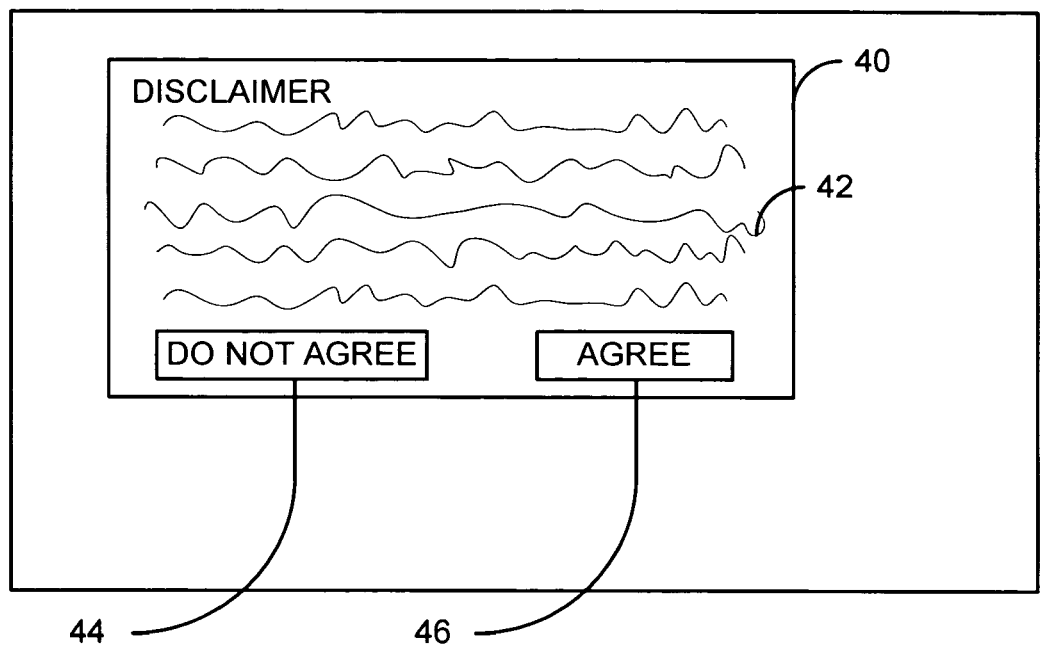
FIG. 4 depicts a prior art disclaimer window format.

The trusted database 152 may include trusted certificates, trusted URLs, or other data that identifies software or locations that are associated with the software. The denied database 154 may include certificates, URLs or other identifiers that are forbidden. The trusted database 152 and denied database 154 could logically be the same database, wherein a given certificate or URL is flagged as either trusted or denied. However, for illustrative purposes, the databases are treated as logically distinct in this application. The disclaimer keyword database 156 may include keywords that indicate potentially undesirable factors. The keywords may include words or other data that are compiled according to a black-listing policy. The black-listing policy may be established by the enterprise and may or may not include addendums or amendments by administrators who consider whether individual requests to interact with software should be allowed. Thus, the black-listing policy may vary over time in accordance with decisions of administrators. In an alternative, the databases 150 are maintained at a remote location, such as an external memory that is accessible from, for example, the enterprise network 106 (FIG. 1). Users of computing devices 108 may have access to the database 150. When a user wishes to interact with software, rather than making a request each time to the administrator, the database 150 can be consulted to determine whether the software has already been designated as trustworthy or is forbidden. This may reduce the amount of time that an administrator must spend determining whether to allow software interaction.

The admin engine 148 may include an interface to the databases 150. In an embodiment with a minimalist admin engine, an administrator may receive a request from a user of one of the computing devices 108 (FIG. 1) via email or some other communication means, decide whether to allow or deny the request, and update the appropriate databases using the admin engine 148. Requests from users are described later with reference to FIG. 10.

Figure 9:
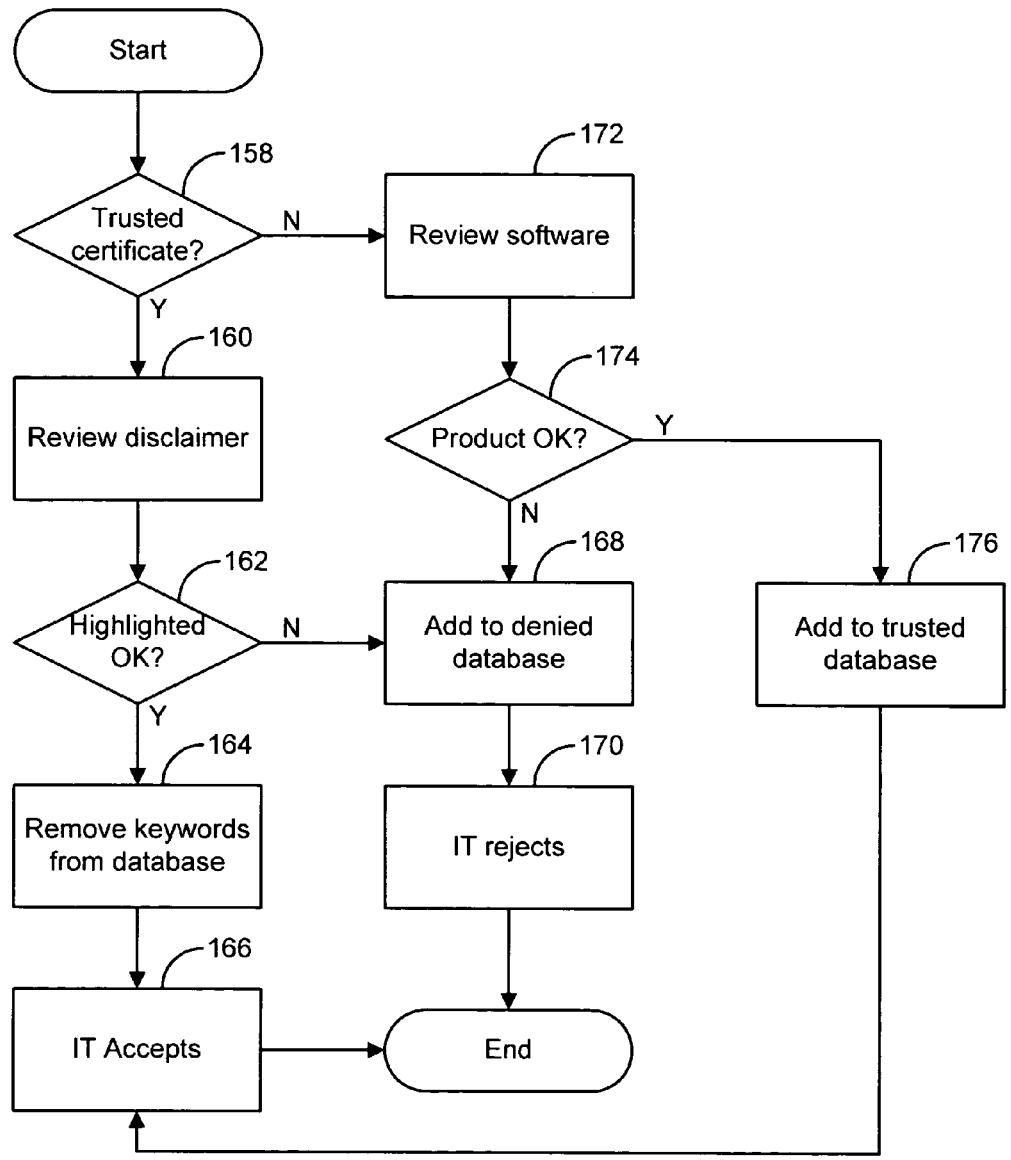
FIG. 9 depicts a flowchart of an exemplary method for use with the administrative computing device of FIG. 8.

FIG. 9 depicts a flowchart of an exemplary method for use with the administrative computing device 110 (FIG. 8). For exemplary purposes, reference is made to the administrative computing device 110 when describing the flowchart. The flowchart begins at decision point 158 where it is determined whether a request is associated with a trusted certificate. If the request is associated with a trusted certificate (158-Yes), then at block 160, an administrator reviews the disclaimer. In the example of FIG. 9, it is assumed that if the certificate is trusted, then there is some other reason that a user was not granted permission to interact with the software. One such reason could be that the disclaimer included keywords that are found in the disclaimer keyword database 156.

At decision point 162, it is determined whether the highlighted words are acceptable. The request may include a disclaimer that has highlighted, flagged, or otherwise noted keywords. The administrator can decide whether the keywords are appropriately highlighted, inappropriately highlighted, or whether the keywords should no longer be highlighted or should not apply in the current disclaimer. If it is determined that the highlighted words are acceptable (162-Yes), then at block 164 the keywords may be removed from the disclaimer keyword database 156. The flowchart ends at block 166 with accepting the request to interact with the software. Acceptance of the request may be implicit in the removal of keywords from the disclaimer keyword database 156 at block 164. The acceptance may also be explicit, such as by the administrator clicking an Accept button. In an alternative, the administrator may not change the disclaimer keyword database 156, but accept the request anyway. This may be because the administrator thinks an exception is in order, or for some other reason.

If at decision point 162, it is determined that the highlighted words are not acceptable (162-No), then at block 168 the denied database 154 may be updated to identify the software. The identifier may be by way of a URL associated with the software or some other identifying mechanism. The flowchart ends at block 170 with rejection of the request. It may also be desirable to update the trusted database 152 if the administrator decides the certificate associated with the software should no longer be trusted. In any case, the rejection of the request may be implicit in the addition to the denied database 154 or removal from the trusted database 152. The rejection may also be explicit, such as by the administrator clicking a Reject button. In an alternative, the administrator may not change the denied database 154, but rejects the request anyway. The administrator may, instead or in addition, add keywords to the disclaimer keyword database 156 or the administrator may simply reject the request, but not change any databases.

If at decision point 158, it is determined that the request is not associated with a trusted certificate (158-No), then at block 172 the software is reviewed. The administrator may review software by reading an associated disclaimer, researching the software, researching the company that provides the software, checking the software for infections or undesirable add-ons, or by performing some other form of analysis. The flowchart continues at decision point 174 with determining whether the software product is acceptable. If it is determined that the software is acceptable (174-Yes), then at block 176 the software may be identified in the trusted database 152 and the flowchart ends at block 166 with accepting the request, as described previously.

If at decision point 174, it is determined that the software product is not acceptable (174-No), then at block 168 the denied database 154 may be updated to identify the software, and the flowchart ends at block 170 with rejecting the request, as described previously.

Figure 10:
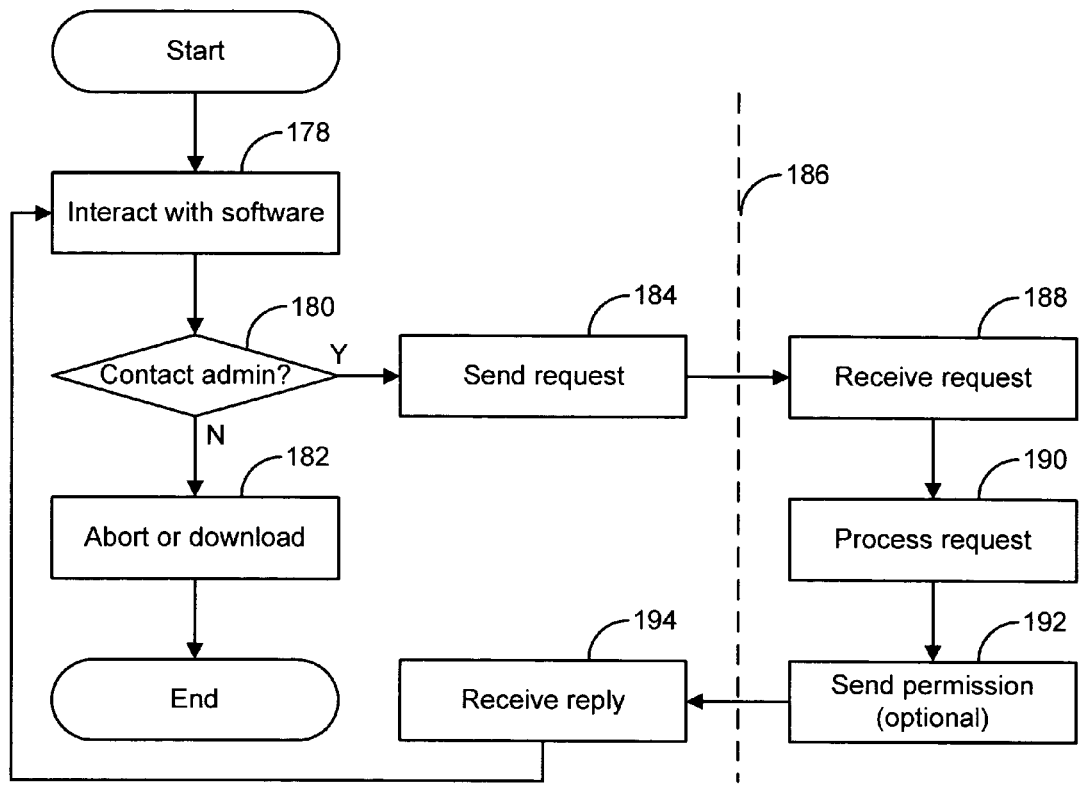
FIG. 10 depicts a flowchart of an exemplary method for use with the system of FIG. 5.

FIG. 10 depicts a flowchart of an exemplary method for use with the system 100 (FIG. 5). Part of FIG. 10 is associated with one of the computing devices 108 (FIG. 5), while another part is associated with the administrative computing device 110 (FIG. 5), as will become apparent in the description.

Figure 11:
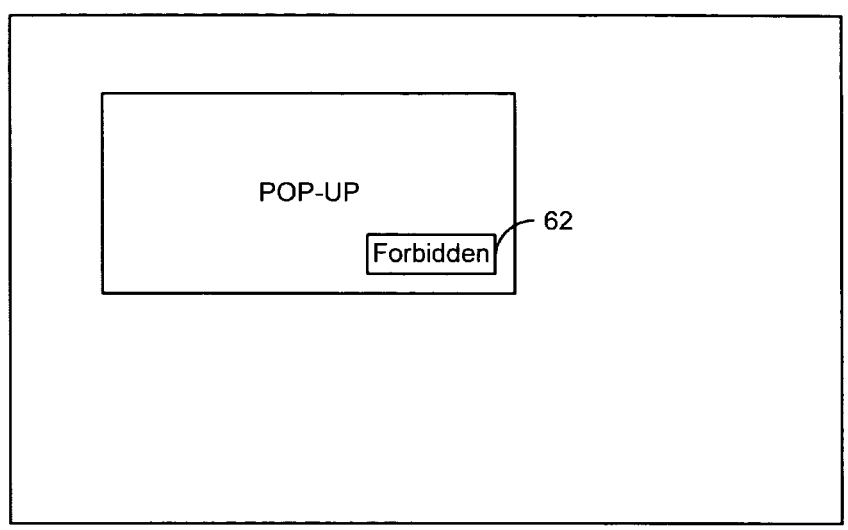
FIG. 11 depicts a modified pop-up window format.

The flowchart of FIG. 7 ends with displaying a graphical widget (at block 140). FIG. 10 continues from that point. As indicated with reference to FIG. 7, the graphical widget may be modified to facilitate a request for permission from an administrator. Accordingly, after interacting with the software at block 178 (which ends in displaying a graphical widget as described with reference to FIG. 7), at decision point 180 it is determined whether an administrator is to be contacted. As previously described, the graphical widget may not have been modified, which would allow a user to interact with the software as desired (e.g., the software is trusted). Alternatively, the graphical widget may have been modified to prevent further interaction with the software. An example of a modification to prevent further interaction is depicted in FIG. 11. As shown in FIG. 11, a pop-up window format 60 has a Forbidden button 62. The Forbidden button 62 replaces, for example, an Okay button (see, e.g., FIG. 1). The Forbidden button 62 is modified so that it has the same functionality as a Cancel button or a No button. Alternatively, the Forbidden button 62 may simply be a dummy button that cannot be clicked. If the graphical widget was either unmodified or further interaction was forbidden, then an administrator need not be contacted (180-No) and the flowchart ends at block 182 with aborting interaction or downloading the software.

Figure 12:
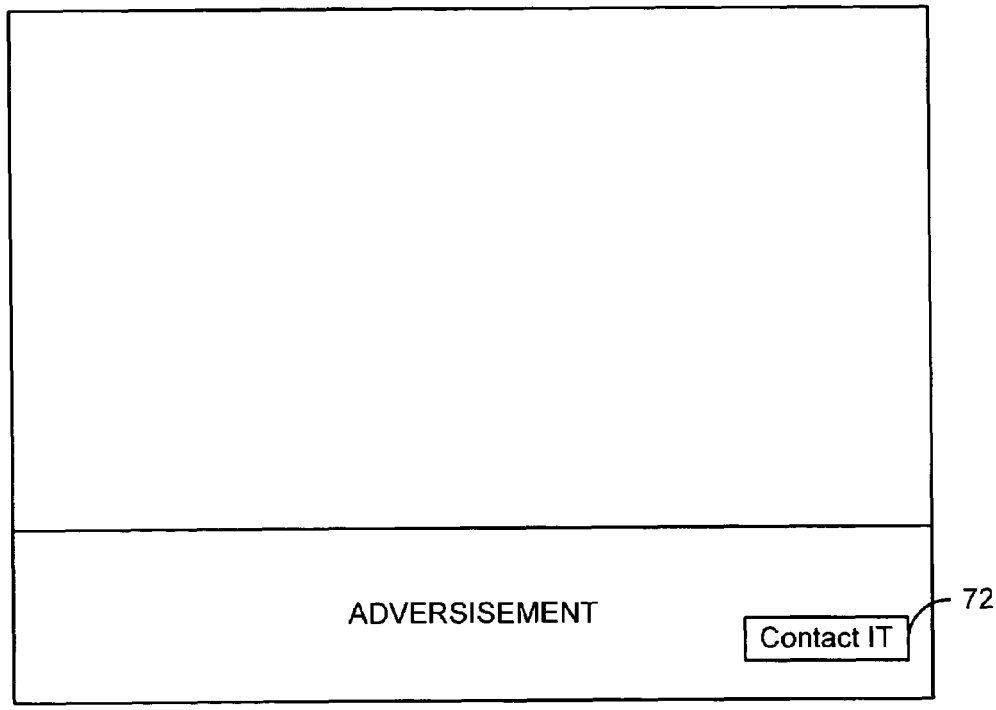
FIG. 12 depicts a modified advertisement window format.
Figure 13:
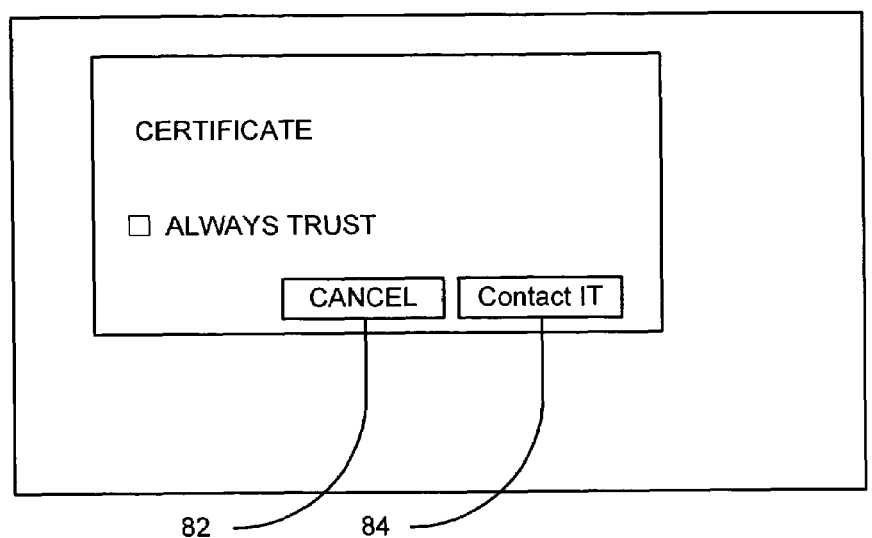
FIG. 13 depicts a modified certificate verification window format.
Figure 14:
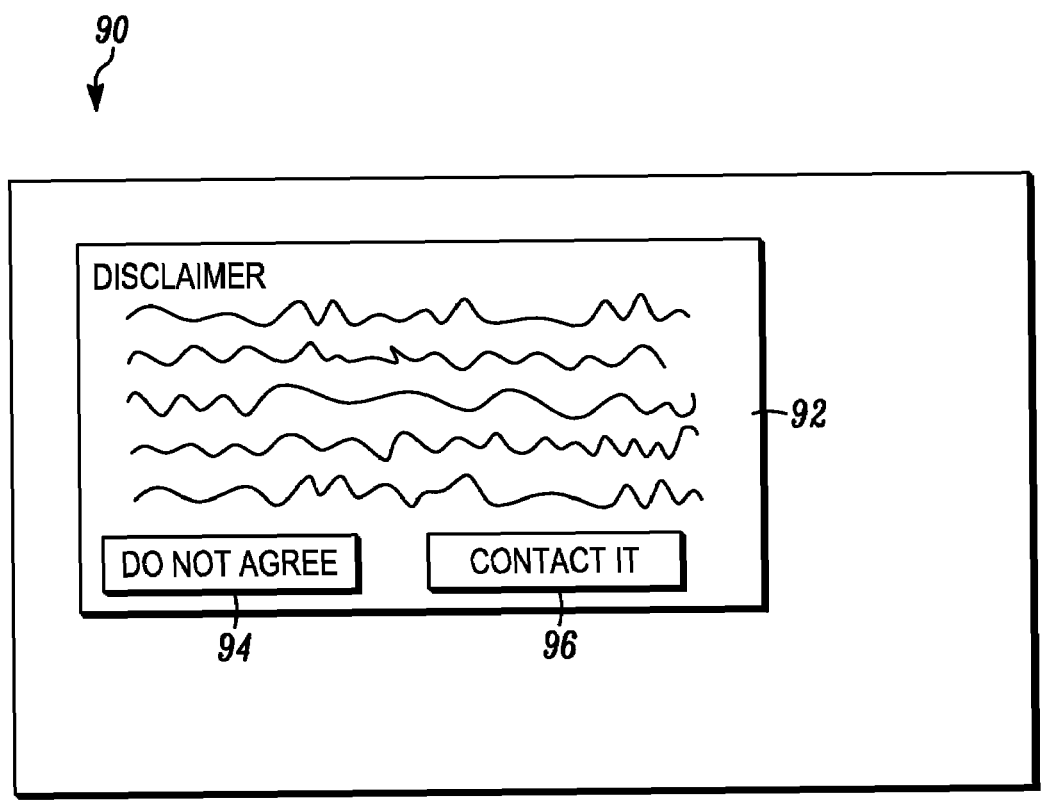
FIG. 14 depicts a modified disclaimer window format.

If it is determined at decision point 180 that an administrator must be contacted before continuing to interact with the software (180-Yes), then the graphical widget may have been modified. Some examples of graphical widgets that were modified to facilitate a request for permission from an administrator are depicted in FIGS. 12 to 14. As depicted in FIG. 12, an advertisement window format 70 has a Contact IT button 72. The Contact IT button 72 replaces, for example, an Okay button (see, e.g., FIG. 2). The Contact IT button is modified so that if a user clicks the Contact IT button, a request for further interaction is sent to an administrator. The request should include some way of identifying the software with which the user wishes to interact. The request may or may not also include some way of identifying the user. The request could be sent by email, the request could be made by updating a request database that the administrator can later access, or the request could be made in some other manner.

FIG. 13 depicts a certificate verification window format 80 that includes a Cancel button 82 and a Contact IT button 84. The Contact IT button 84 replaces an Okay button (see, e.g., FIG. 3). The certificate verification window may have included an Always Trust checkbox (see, e.g., FIG. 3). In an embodiment, the checkbox is removed. For example, if the user clicks on the Contact IT button 84, the administrator should receive a request, as described previously with reference to FIG. 12, then make a decision about whether to trust the certificate. The decision whether to always trust the certificate might be more appropriate for the administrator to make rather than the user. Accordingly, the checkbox is removed when the graphical widget is modified. Alternatively, the checkbox could remain in the certificate verification window and the administrator could choose to check or uncheck the checkbox, as deemed appropriate.

FIG. 14 depicts a disclaimer window format 90 that includes highlighted disclaimer text 92, a Do Not Agree button 94, and a Contact IT button 96. The Contact IT button 96 replaces an Agree button (see, e.g., FIG. 4). The highlighted disclaimer text 92 has been modified to highlight or otherwise note keywords that have been identified by, for example, a parsing engine 128 (FIG. 6). The highlighted disclaimer text 92 replaces the usual disclaimer text (see, e.g., FIG. 4). If the user clicks the Contact IT button 96, the administrator should receive a request, as described previously with reference to FIG. 12. In an embodiment, the highlighted disclaimer text is included in the request, allowing the administrator to see what keywords have been identified in the disclaimer. In this way, the keywords can be identified for both the user and the administrator to see. In an alternative, the administrator has access to the highlighted disclaimer text, but the user has access to unmodified (e.g., unhighlighted) disclaimer text.

Referring once again to FIG. 10, if it is determined at decision point 180 that an administrator is to be contacted (180-Yes), then at block 184 the user may contact the administrator by, for example, clicking on a Contact IT button. Contact with the administrator may be via, e.g., CSN, and may include the certificate and highlighted disclaimer text. In an alternative, the user may be allowed to interact with the software, subject to further review by the administrator. For example, the user may download and install software while simultaneously notifying the administrator. The administrator can then determine whether the software download should be allowed in the future and whether the software should be cleaned out of the user's computer. While this has the disadvantage of increasing the likelihood of having malicious software installed on a computer and increasing costs associated with removing the malicious software, it has the advantage of allowing users to download what they want immediately instead of waiting for a response from the administrator.

The dashed line 186 depicted in FIG. 10 represents a physical or logical division between a computing device 108 (FIG. 5), and an administrative computing device 110 (FIG. 5). The boxes and decision points to the left of the dashed line 186 are associated with the computing device 108 and the boxes and decision points to the right of the dashed line 186 are associated with the administrative computing device 110. Accordingly, after a request is sent at block 184, the flowchart continues at block 188 with receiving the request at the administrative computing device. The flowchart continues at block 190 with processing the request. FIG. 9, previously described, depicts a flowchart of an exemplary method for processing the request. The flowchart continues at block 192 with sending explicit permission (or lack thereof) back to the computing device 108. Sending the permission may or may not be generated automatically when the administrator modifies one or more of the databases 150. Sending the permission may or may not be generated automatically when the administrator clicks, for example, an Accept button or a Reject button (or performs equivalent actions signifying the acceptance or rejection of the request). Sending the permission may or may not be optionally sent by the administrator, or permission may not be explicitly sent at all, which is a reason block 192 is labeled optional. In an alternative, the permission (or lack thereof) is implicit rather than explicit. For example, permission may be implicit when the software associated with the request is identified in a trusted database or the keywords noted in the associated disclaimer are removed from a disclaimer keyword database. The rejection of the request may be implicit when the software associated with the request is identified in a denied database.

The flowchart continues at block 194 with receiving from the administrative computing device 110 (FIG. 5) the explicit or implicit permission (or lack thereof) to interact with the software at the computing device 108 (FIG. 5). The flowchart continues at block 178 with the user interacting with the software once again. Assuming the administrator gave permission, at decision point 180 it should be determined that the administrator need not be contacted (180-No) and the flowchart ends at block 182 with downloading, installing, or otherwise interacting with the software. In an embodiment, even if the administrator denies the request and the user interacts with the software again, the flowchart continues at block 178. Assuming the administrator updated the denied database, at decision point 180 it should be determined that the administrator need not be contacted (180-No) and the flowchart ends at block 182 with aborting the interaction.

Figure 15:
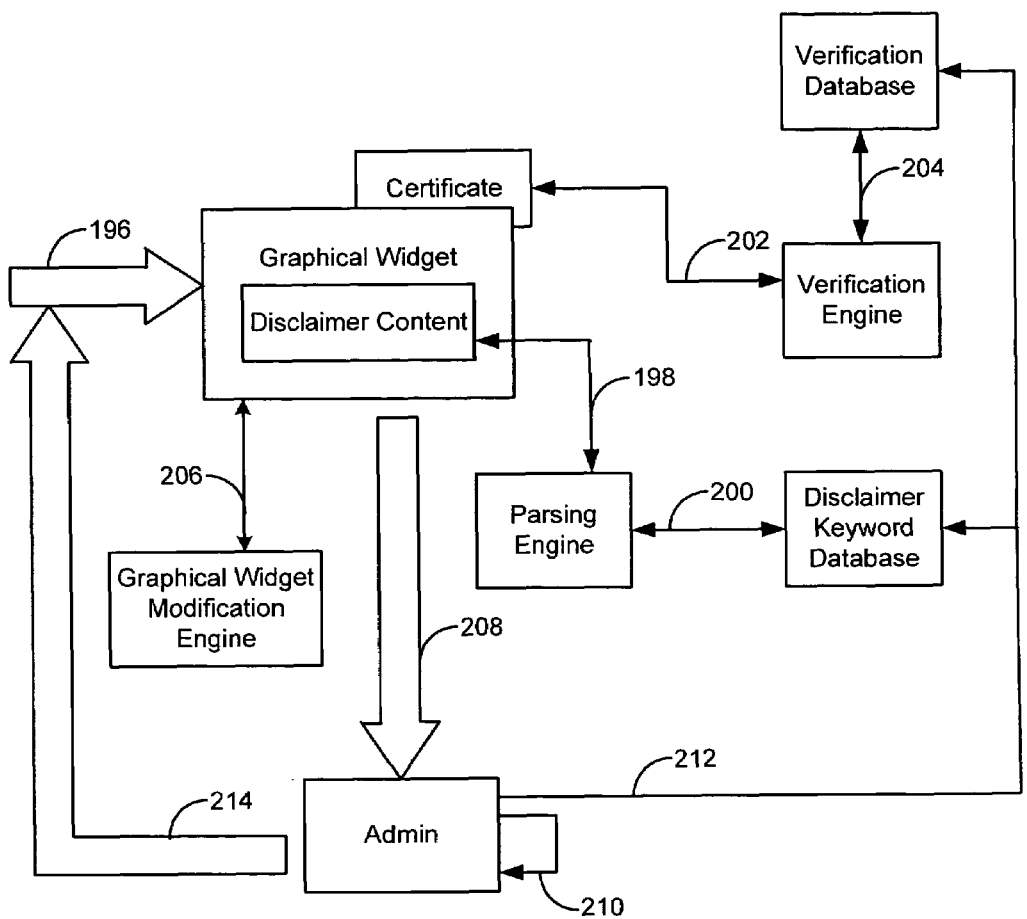
FIG. 15 depicts a conceptual flowchart of an exemplary method for reducing risks associated with malicious software installation.

FIG. 15 depicts a conceptual flowchart of an exemplary method for reducing risks associated with malicious software installation. For the purposes of example, it is assumed that the actions taken with respect to the flowchart are either by an employee of an enterprise, by an IT administrator at the enterprise, or by one or more computing devices. As previously discussed, methods according to embodiments are applicable to any type of software interaction, do not require certificates, and do not require disclaimers. Nevertheless, for the purpose of example, it is assumed that the software interaction is software installation, the software has an associated certificate, and the software has an associated disclaimer.

The flowchart includes an action arrow 196 that serves to represent the start of software installation. A graphical widget displays disclaimer content that a parsing engine parses (198) using (200) a disclaimer keyword database to identify keywords in the disclaimer content. An algorithm could be based on disclaimer-text parsing to find keywords belonging to a corporate black list.

A verification engine verifies (202) a certificate associated with the graphical widget using (204) a verification database. The verification database may include certificate keys or other information that identifies the certificate as trusted. The verification database may also include information that identifies the certificate as being associated with forbidden software. The verification database may instead include no information about the certificate.

A graphical widget modification engine modifies (206) the graphical widget according to the results of the parsing engine and the verification engine. If the parsing engine identifies keywords in the disclaimer content, the graphical widget modification engine may modify the graphical widget such that keywords identified in the disclaimer content are highlighted. If the verification engine identifies the certificate as being associated with forbidden software, the graphical widget may be modified to prevent the installation of the software, such as by replacing an Okay button with a Forbidden button that has the same functionality as a Cancel button. If the verification engine identifies the certificate as trusted, the graphical widget modification engine may modify the graphical widget to force the employee to contact an IT administrator, such as by replacing an Okay button with a Contact IT button that, when clicked, sends a request to an IT administrator asking for permission to install the software. However, if the parsing engine identified no keywords and the certificate is identified as trusted, then contacting the IT administrator may be unnecessary.

The action arrow 208 represents contacting the IT administrator by, for example, CSN. The IT administrator may receive the highlighted disclaimer content, the certificate, and/or some means for identifying the software, such as a URL from which the software can be downloaded, an installer associated with the software, the name of the software, the manufacturer of the software, the vendor of the software, etc. The IT administrator then checks (210) the software product itself, the disclaimer, or some other data associated with the software to determine whether software installation should be allowed. The determination may be made according to any criteria deemed appropriate by the enterprise or the IT administrator. The IT administrator may modify (212) databases according to the determination. For example, if the software is determined to be forbidden, the IT administrator may add some means of identifying the software, such as a URL, a certificate key, or some other indicia, to a database that identifies forbidden software. If the software is determined to be allowed, the IT administrator may add some means of identifying the software to a database that identifies trusted software or the IT administrator may remove keywords from a database that identifies keywords in disclaimer content.

The action arrow 214 represents passing control from the IT administrator back to the employee. The IT administrator may let the employee know the results of the determination, or the employee may simply have to attempt installation again to find out whether the installation is allowed. Regardless, in an embodiment, when the employee attempts to install the software again, the result is either that the installation is forbidden, or that the installation is allowed; contacting the IT administrator again is unnecessary.

Figure 16:
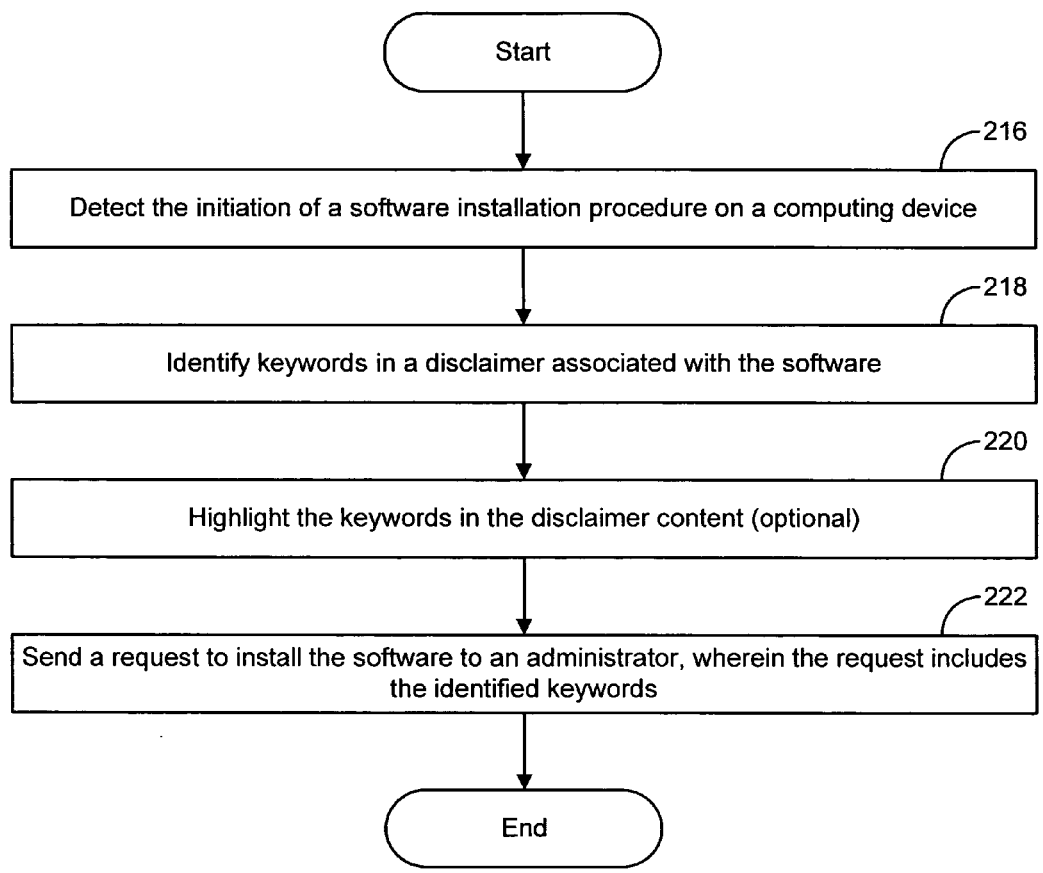
FIG. 16 depicts a flowchart of an exemplary method for reducing risks associated with malicious software installation.

FIG. 16 depicts a flowchart of an exemplary method for reducing risks associated with malicious software installation. The flowchart starts at block 216 with detecting the initiation of a software installation procedure on a computing device. The software installation procedure may be detected as an attempted download of software, attempted installation of software from memory, attempted installation of software from a storage device, or some other procedure for moving at least part of a software product into the memory of the computing device or storage devices associated with the computing device.

The flowchart continues at block 218 with identifying keywords in a disclaimer associated with the software. The disclaimer may be in a pop-up window as described above, in a file, or in some other electronic storage that can be read by a processor of the computing device.

The flowchart continues at optional block 220 with highlighting the keywords in the disclaimer content. Though highlighting the keywords can make the keywords more readily detectable to the human eye, this block is optional. It should be noted that in an alternative, highlighting refers to any type of identification or flagging of the keywords. For example, the disclaimer could be highlighted in such a way that a human would not detect the highlights, but a computer could.

The flowchart ends at block 222 with sending a request to install the software to an administrator, wherein the request includes the identified keywords. As described previously, the administrator may then reject the request or grant permission.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A computer program product for reducing risks associated with software interaction, the computer program product for use in conjunction with a computer system, the computer program product comprising a computer readable storage medium and a computer program mechanism embedded therein, the computer program mechanism comprising one or more software modules having executable instructions for:

identifying keywords in a disclaimer associated with a software product by searching the disclaimer for the keywords without user interaction, wherein the disclaimer includes a graphical widget to interact with the software product;

highlighting the keywords in the disclaimer that resulted from searching the disclaimer without user interaction;

removing interactive content that facilitates interaction with the software product by modifying the graphical widget to prevent interaction with the software product; and adding interactive content that facilitates sending a request for permission to interact further with the software product by modifying the graphical widget to facilitate sending the request for permission, wherein said request includes the highlighted disclaimer.

2. The computer program product of claim 1, further comprising one or more software modules having executable instructions for checking a certificate associated with the software product and removing interactive content if the certificate is denied.

3. The computer program product of claim 1, further comprising one or more software modules having executable instructions for checking a certificate associated with the software product, wherein said request includes the certificate if the certificate is not denied.

4. The computer program product of claim 1, wherein the interactive content that facilitates interaction with the software product includes a button in a graphical window.

5. The computer program product of claim 1, wherein the interactive content that facilitates sending a request for permission includes a button in a graphical window.

6. A method for reducing risks associated with software interaction, comprising the computer-implemented acts of:

parsing a disclaimer associated with a software product to identify keywords in the disclaimer content by searching the disclaimer for the keywords without user interaction, wherein the disclaimer includes a graphical widget to interact with the software product;

removing from a graphical display interactive content that facilitates interaction with the software product if keywords are identified in the disclaimer content by modifying the graphical widget to prevent interaction with the software product; and adding to the graphical display interactive content that facilitates sending a request for permission to further interact with the software product if keywords are identified in the disclaimer content by modifying the graphical widget to facilitate sending the request for permission.

7. The method of claim 6, further comprising the computer-implemented act of verifying a certificate associated with the software product.

8. The method of claim 7, further comprising the computer-implemented act of comparing the certificate against a database of denied certificates and removing from the graphical display all interactive content that facilitates interaction with the software product if the certificate is denied.

9. The method of claim 7, further comprising the computer-implemented acts of comparing the certificate against a database of trusted certificates and removing from the graphical display interactive content that facilitates interaction with the software product if the certificate is unverified.

10. The method of claim 6, further comprising the computer-implemented acts of highlighting in said graphical display keywords identified in the disclaimer content.

11. The method of claim 6, further comprising the computer-implemented acts of highlighting keywords identified in the disclaimer content and including the highlighted disclaimer content in the request for permission to further interact with the software product.

12. A method for reducing risks associated with software interaction, comprising the computer-implemented acts of:
   identifying keywords in a disclaimer associated with a software product by searching the disclaimer for the keywords without user interaction, wherein the disclaimer includes a graphical widget to interact with the software product;
   highlighting the keywords in the disclaimer that resulted from searching the disclaimer without user interaction;
   removing interactive content that facilitates interaction with the software product by modifying the graphical widget to prevent interaction with the software product; and
   adding interactive content that facilitates sending a request for permission to interact further with the software product by modifying the graphical widget to facilitate sending the request for permission, wherein said request includes the highlighted disclaimer.

13. The method of claim 12, further comprising the computer-implemented act of checking a certificate associated with the software product and removing interactive content if the certificate is denied.

14. The method of claim 12, further comprising the computer-implemented act of checking a certificate associated with the software product, wherein said request includes the certificate if the certificate is not denied.

15. The method of claim 12, wherein the interactive content that facilitates interaction with the software product includes a button in a graphical window.

16. The method of claim 12, wherein the interactive content that facilitates sending a request for permission includes a button in a graphical window.

17. A computer program product for reducing risks associated with software interaction, the computer program product for use in conjunction with a computer system, the computer program product comprising a computer readable storage medium and a computer program mechanism embedded therein, the computer program mechanism comprising one or more software modules having executable instructions for:
   parsing a disclaimer associated with a software product to identify keywords in the disclaimer content by searching the disclaimer for the keywords without user interaction, wherein the disclaimer includes a graphical widget to interact with the software product;
   removing from a graphical display interactive content that facilitates interaction with the software product if keywords are identified in the disclaimer content by modifying the graphical widget to prevent interaction with the software product; and
   adding to the graphical display interactive content that facilitates sending a request for permission to further interact with the software product if keywords are identified in the disclaimer content by modifying the graphical widget to facilitate sending the request for permission.

18. The computer program product of claim 17, further comprising one or more software modules having executable instructions for verifying a certificate associated with the software product.

19. The computer program product of claim 18, further comprising one or more software modules having executable instructions for comparing the certificate against a database of denied certificates and removing from the graphical display all interactive content that facilitates interaction with the software product if the certificate is denied.

20. The computer program product of claim 18, further comprising one or more software modules having executable instructions for comparing the certificate against a database of trusted certificates and removing from the graphical display interactive content that facilitates interaction with the software product if the certificate is unverified.

21. The computer program product of claim 17, further comprising one or more software modules having executable instructions for highlighting in said graphical display keywords identified in the disclaimer content.

22. The computer program product of claim 17, further comprising one or more software modules having executable instructions for highlighting keywords identified in the disclaimer content and including the highlighted disclaimer content in the request for permission to further interact with the software product.

* * * * *

UNITED STATES PATENT AND TRADEMARK OFFICE
CERTIFICATE OF CORRECTION

PATENT NO. : 7,587,676 B2  Page 1 of 1
APPLICATION NO. : 10/931648
DATED : September 8, 2009
INVENTOR(S) : Gomez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Twenty-first Day of September, 2010

David J. Kappos
*Director of the United States Patent and Trademark Office*